United States Patent
Upadhye et al.

(10) Patent No.: US 11,154,935 B2
(45) Date of Patent: Oct. 26, 2021

(54) AIR KNIFE FOR ADDITIVE MANUFACTURING

(71) Applicant: Applied Materials, Inc., Santa Clara, CA (US)

(72) Inventors: Bahubali S. Upadhye, Bangalore (IN); Sumedh Acharya, Bangalore (IN); Sandip Desai, Bangalore (IN); David Masayuki Ishikawa, Mountain View, CA (US); Eric Ng, Mountain View, CA (US); Hou T. Ng, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 12 days.

(21) Appl. No.: 16/428,784

(22) Filed: May 31, 2019

(65) Prior Publication Data

US 2019/0366434 A1  Dec. 5, 2019

Related U.S. Application Data

(60) Provisional application No. 62/679,622, filed on Jun. 1, 2018.

(51) Int. Cl.
*B22F 12/00* (2021.01)
*B33Y 30/00* (2015.01)
(Continued)

(52) U.S. Cl.
CPC ............ *B22F 12/00* (2021.01); *B23K 26/342* (2015.10); *B33Y 30/00* (2014.12); *B33Y 40/00* (2014.12); *B22F 10/10* (2021.01)

(58) Field of Classification Search
CPC ...... B23K 26/142; D21H 5/007; D21H 25/16; B29C 64/35; B29C 64/30; F26B 9/085; F26B 11/0481
See application file for complete search history.

(56) References Cited

U.S. PATENT DOCUMENTS 6,193,923 B1   2/2001  Leyden et al.
6,215,093 B1   4/2001  Meiners et al.
(Continued)

FOREIGN PATENT DOCUMENTS

CN   105331952   2/2016
CN   106623928   5/2017
(Continued)

OTHER PUBLICATIONS

PCT International Search Report and Written Opinion in International Appln. No. PCTUS/2019/034272, dated Oct. 21, 2019, 12 pages.

*Primary Examiner* — Joseph S Del Sole
*Assistant Examiner* — Ariella Machness
(74) *Attorney, Agent, or Firm* — Fish & Richardson P.C.

(57) ABSTRACT

An additive manufacturing apparatus includes a platform, a dispenser configured to deliver a plurality of successive layers of feed material on the platform, at least one energy source to selectively fuse feed material in a layer on the platform, and an air knife supply unit. The air knife supply unit includes a tube having a plurality of holes spaced along a length of the tube, a multi-fluted helical screw positioned in the tube, a gas inlet configured to supply a gas into an end of the tube with the screw configured to guide the gas from the gas inlet through the tube and out the holes, and a spiral plenum surrounding the tube with the spiral plenum including an inner end to receive gas from the holes and an outer end to deliver the gas over the platform.

14 Claims, 10 Drawing Sheets

(51) Int. Cl.
  *B23K 26/342* (2014.01)
  *B33Y 40/00* (2020.01)
  *B22F 10/10* (2021.01)

(56) References Cited

U.S. PATENT DOCUMENTS

| | | | |
|---|---|---|---|
| 6,338,438 B1 * | 1/2002 | Walzel | B05B 3/001 |
| | | | 239/398 |
| 6,696,664 B2 | 2/2004 | Pyritz et al. | |
| 7,067,021 B2 | 6/2006 | Fujita et al. | |
| 7,261,542 B2 | 8/2007 | Hickerson et al. | |
| 7,326,377 B2 | 2/2008 | Adams | |
| 8,718,522 B2 | 5/2014 | Chillscyzn et al. | |
| 9,776,362 B2 | 10/2017 | Chuang et al. | |
| 9,956,612 B1 | 5/2018 | Redding et al. | |
| 2003/0075836 A1 * | 4/2003 | Fong | B29C 41/46 |
| | | | 264/401 |
| 2007/0241482 A1 | 10/2007 | Giller et al. | |
| 2014/0263209 A1 | 9/2014 | Burris et al. | |
| 2015/0041025 A1 | 2/2015 | Wescott et al. | |
| 2016/0001401 A1 | 1/2016 | Dimter et al. | |
| 2016/0121398 A1 | 5/2016 | Schlick et al. | |
| 2016/0136731 A1 | 5/2016 | Mcmurtry et al. | |
| 2017/0014906 A1 * | 1/2017 | Ng | B23K 26/703 |
| 2017/0120330 A1 | 5/2017 | Sutcliffe et al. | |
| 2017/0216916 A1 * | 8/2017 | Nyrhila | B29C 64/153 |
| 2018/0200963 A1 | 7/2018 | Bogdan, Jr. et al. | |
| 2018/0221953 A1 | 8/2018 | Ng et al. | |
| 2018/0236603 A1 | 8/2018 | Carter et al. | |
| 2019/0176233 A1 | 6/2019 | Varetti et al. | |
| 2019/0240924 A1 | 8/2019 | Hendrik | |

FOREIGN PATENT DOCUMENTS

| | | |
|---|---|---|
| CN | 206169294 | 5/2017 |
| EP | 2001656 | 12/2008 |
| JP | 3621703 | 2/2005 |
| JP | 2007-021747 | 2/2007 |
| JP | 2015 104837 | 6/2015 |
| KR | 10-2019-0016736 | 2/2019 |
| WO | WO 92-08592 | 5/1992 |
| WO | WO 2015-056230 | 4/2015 |
| WO | WO 2015-170330 | 11/2015 |
| WO | WO 2017/013454 | 1/2017 |

* cited by examiner

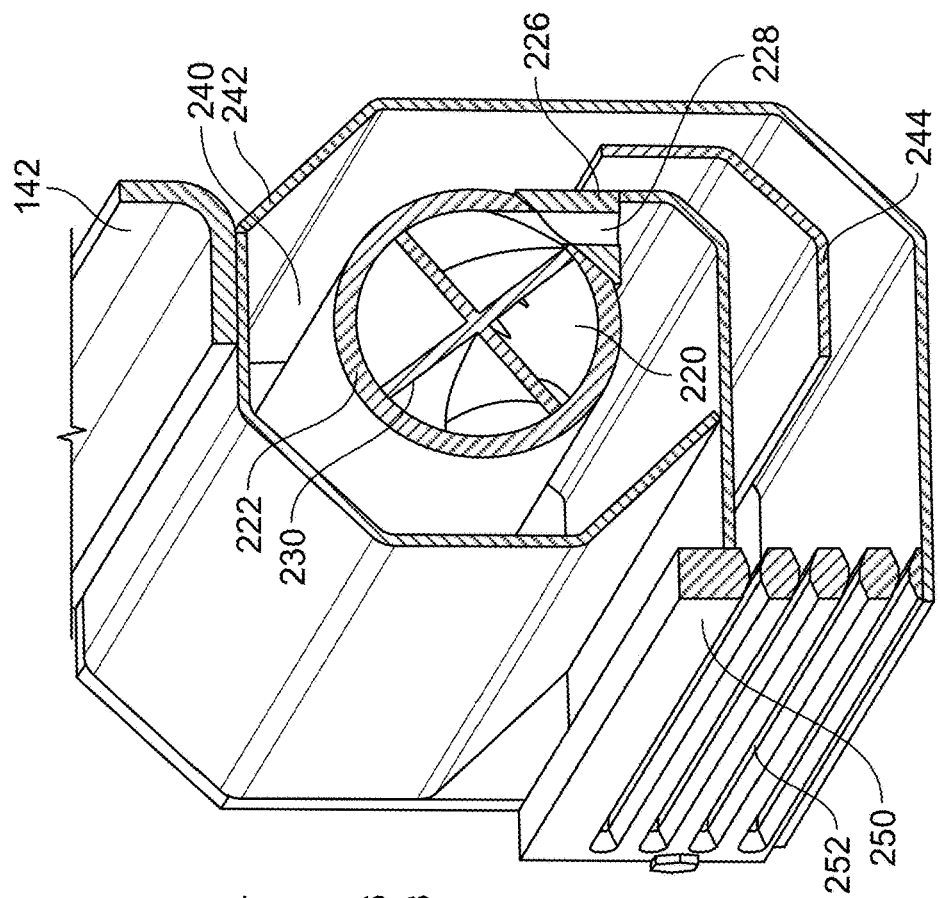
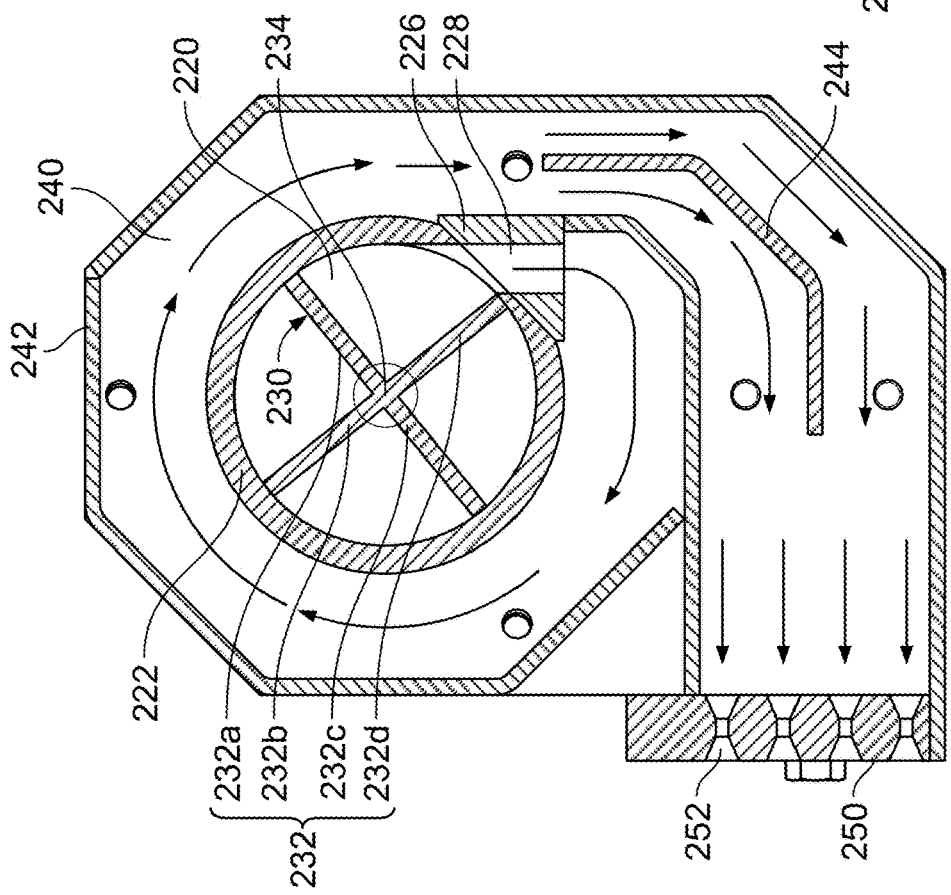

AIR KNIFE FOR ADDITIVE MANUFACTURING

CROSS-REFERENCE TO RELATED APPLICATIONS

This application claims priority to U.S. Provisional Application Ser. No. 62/679,622, filed Jun. 1, 2018.

TECHNICAL FIELD

This disclosure relates to an air knife for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, an additive manufacturing apparatus includes a platform, a dispenser configured to deliver a plurality of successive layers of feed material on the platform, at least one energy source to selectively fuse feed material in a layer on the platform, and an air knife supply unit. The air knife supply unit includes a tube having a plurality of holes spaced along a length of the tube, a multi-fluted helical screw positioned in the tube, a gas inlet configured to supply a gas into an end of the tube with the screw configured to guide the gas from the gas inlet through the tube to the holes, and a spiral plenum surrounding the tube with an inner end to receive gas from the holes and an outer end to deliver the gas over the platform.

Implementations may include one or more of the following features.

A nozzle plate may be positioned at the outer end of the spiral plenum. The nozzle plate may include a plurality of horizontally extending slots or holes. The output end of the spiral plenum may be configured to discharge the gas in a laminar flow parallel to a top surface of the platform. An air knife exhaust unit may include a second tube having a second plurality of holes spaced along the length of the tube, a second multi-fluted helical screw positioned in the second tube, a gas outlet configured to receive gas at an end of the second tube with the second screw configured such that the flutes guide the gas from the holes to the gas outlet at the end of the second tube, and a second spiral plenum surrounding the second tube with the second spiral plenum including an outer end to receive gas from over the platform and an inner end to deliver the gas to the holes.

Particular implementations of the subject matter described in this disclosure can be implemented so as to realize one or more of the following advantages. Gas can flow across a powder bed at a speed that is uniform both across the build plate and along the z-axis perpendicular to the build plate. The gas can have a flow velocity sufficient, e.g., 1 m/s to 5 m/s, to carry away spatter induced by metal vapor. This can reduce undesirable inclusions in the part being fabricated and improve performance of the part.

The details of one or more implementations are set forth in the accompanying drawings and the description. Other features, aspects, and advantages of the subject matter will become apparent from the description, the drawings, and the claims.

BRIEF DESCRIPTION OF THE DRAWINGS

FIG. 5 is a schematic cross-sectional side view of the air knife.

FIG. 6 is a schematic expanded perspective view of the air knife.

Like reference numbers and designations in the various drawings indicate like elements.

DETAILED DESCRIPTION

In many additive manufacturing processes, energy is selectively delivered to a layer of feed material, e.g., powder, dispensed by an additive manufacturing apparatus to fuse the feed material in a pattern, thereby forming a portion of an object. For example, a light beam, e.g., a laser beam, can be reflected off a galvo scanner or a rotating polygon scanner to drive the light beam in a path across the layer of feed material. During this fusing process, vapor can be generated as the powder is fused. For example, where the feed material is a metal powder, vapor trapped in the metal powder can be released when the metal is melted. In addition, a portion of the liquid metal itself could be vaporized. This vapor can generate spatter. For example, liquid portions of the molten pool of metal can be ejected when the vapor boils out of the metal, powder particles can similarly be blown from the layer of powder by the vapor escaping from the liquid metal, and vaporized metal can precipitate to form a liquid. This spatter can contaminate surrounding regions of the part, resulting in undesirable inclusions, which can negatively impact the performance of the object.

A technique to reduce spatter is to use an "air knife" to blow the vapor and/or spatter away from the layer, thus reducing the likelihood of contamination. However, any non-uniformity in the air flow from the knife can result in inefficient spatter mitigation. An air knife having some or all of the features described below can provide improved uniformity of air flow across the build plate.

Additive Manufacturing Apparatus

Figure 1:
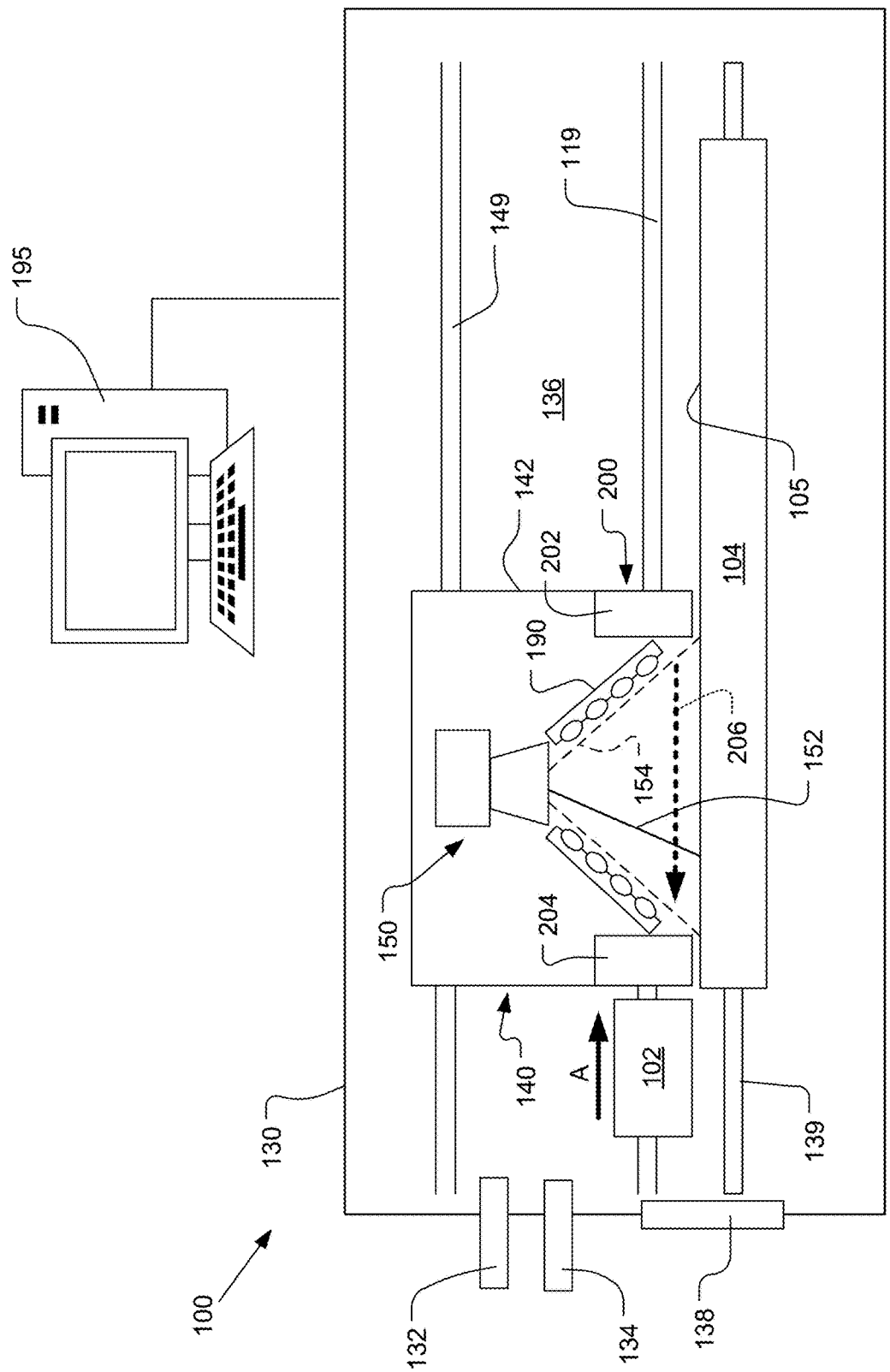
FIG. 1 is a schematic side view of an example additive manufacturing apparatus.

FIG. 1 illustrates a schematic side view of an example additive manufacturing (AM) apparatus 100 that includes a printhead 102 and a build platform 104 (e.g., a build stage). The printhead 102 dispenses layers of one or more powders on a top surface 105 of the platform 104. By repeatedly dispensing and fusing layers of powder, the apparatus 100 can form a part on the platform.

The printhead 102 and the build platform 104 can both be enclosed in a housing 130 that forms a sealed chamber 136, e.g., a vacuum chamber, that provides a controlled operating environment. The chamber 136 can include an inlet 132 coupled to a gas source and an outlet 134 coupled to an exhaust system, e.g., a pump. The gas source can provide an inert gas, e.g. Ar, or a gas that is non-reactive at the temperatures reached by the powder for melting or sintering, e.g., $N_2$. This permits the pressure and oxygen content of the interior of the housing 130 to be controlled. For example, oxygen gas can be maintained at a partial pressure below 0.01 atmospheres.

The chamber 136 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Ti powder particles. A load lock chamber accessible through a valve 138, e.g., a slit valve, can be used to separate the chamber 136 from the external environment while permitting parts, e.g., the build platform with the fabricated object, to be removed from the chamber. For example, the build platform 104 can be movable on a track 139, e.g., a rail.

Figure 2A:
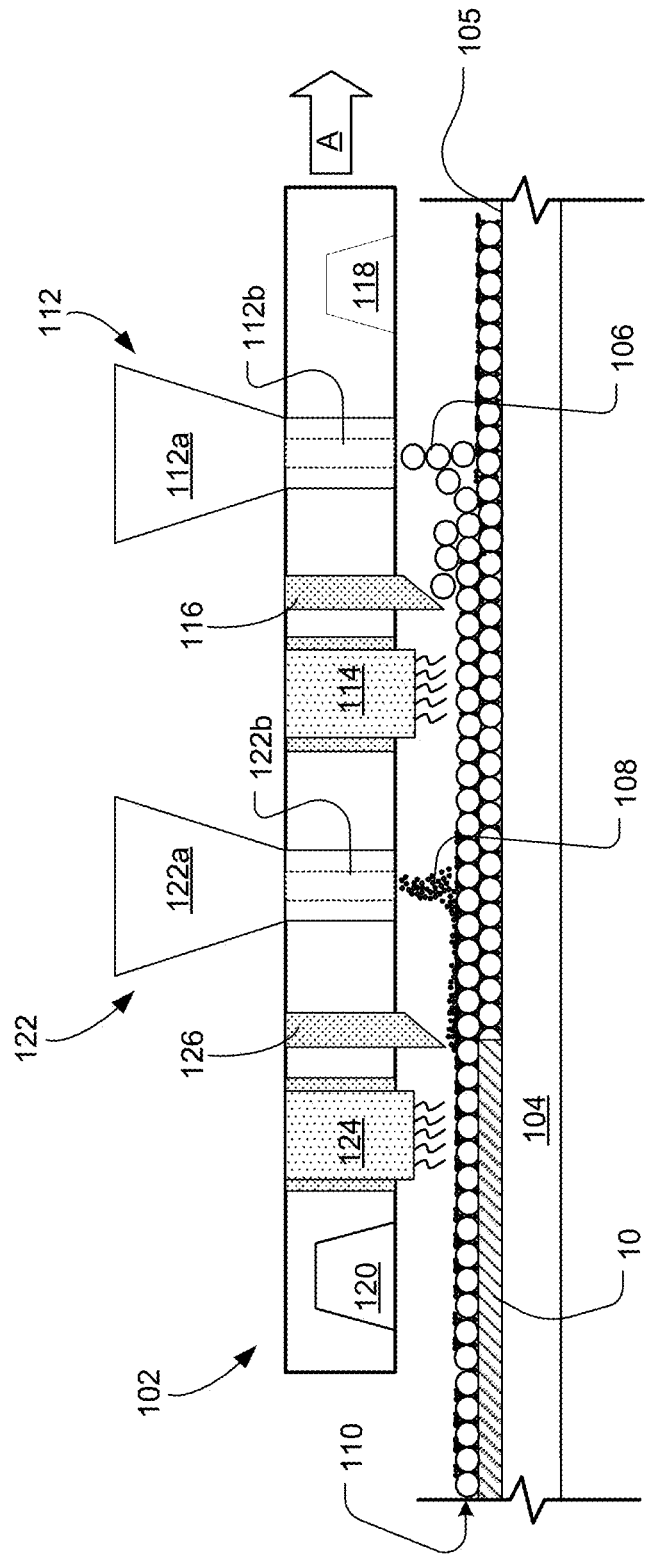
FIGS. 2A and 2B are schematic side and top views of a printhead from the additive manufacturing apparatus.
Figure 2B:
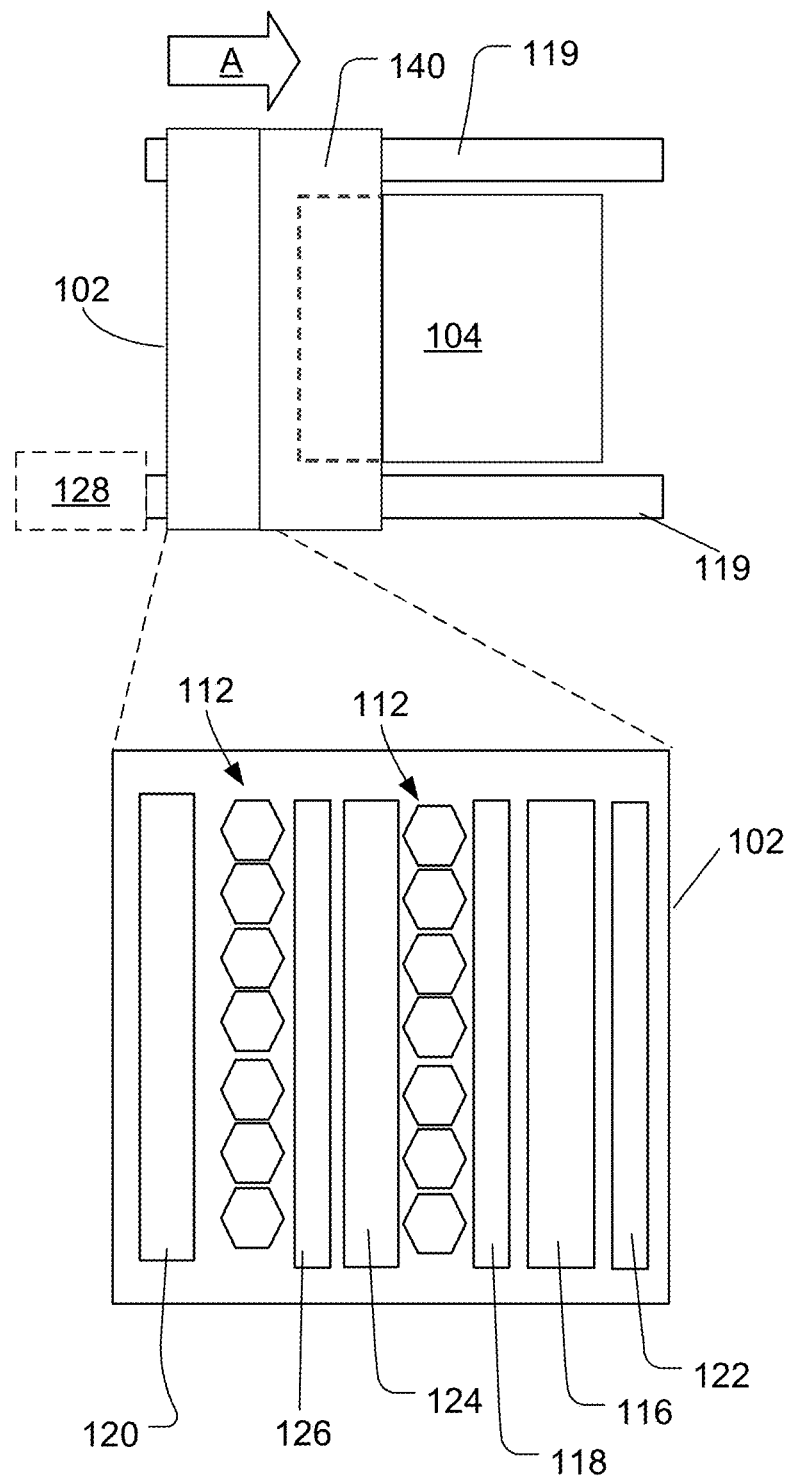

Referring to FIGS. 1 and 2B, the printhead 102 is configured to traverse the platform 104 (shown by arrow A). For example, the apparatus 100 can include a support, e.g., a linear rail or pair of linear rails 119, along which the printhead can be moved by a linear actuator and/or motor. This permits the printhead 102 to move across the platform 104 along a first horizontal axis. In some implementations, the printhead 102 can also move along a second horizontal axis perpendicular to the first axis.

The printhead 102 can also be movable along a vertical axis. In particular, after each layer is fused, the printhead 102 can be lifted by an amount equal to the thickness of the deposited layer 110 of powder. This can maintain a constant height difference between the dispenser on the printhead and the top of the powder on the platform 104. A drive mechanism, e.g., a piston or linear actuator, can be connected to the printhead or support holding the printhead to control the height of the printhead. Alternatively, the printhead 102 can be held in a fixed vertical position, and the platform 104 can be lowered after each layer is deposited.

Referring to FIGS. 2A and 2B, the printhead 102 includes at least a first dispenser 112 to selectively dispense a layer 110 of a powder 106 on the build platform 104, e.g., directly on the build platform 104 or on a previously deposited layer. In the implementation illustrated in FIG. 2A, the first dispenser 112 includes a hopper 112a to receive the powder 106. The powder 106 can travel through a channel 112b having a controllable aperture, e.g., a valve, that controls whether the powder is dispensed onto the platform 104. In some implementations, the first dispenser 112 includes a plurality of independently controllable apertures, so that the powder can be controllably delivered along a line perpendicular to the direction of travel A.

Optionally, the printhead 102 can include a heater 114 to raise the temperature of the deposited powder. The heater 114 can heat the deposited powder to a temperature that is below its sintering or melting temperature. The heater 114 can be, for example, a heat lamp array. The heater 114 can be located, relative to the forward moving direction of the printhead 102, behind the first dispenser 112. As the printhead 102 moves in the forward direction, the heater 114 moves across the area where the first dispenser 112 was previously located.

Optionally, the printhead 102 can also include a first spreader 116, e.g., a roller or blade, that cooperates with first the dispensing system 112 to compact and spread powder dispensed by the first dispenser 112. The first spreader 116 can provide the layer with a substantially uniform thickness. In some cases, the first spreader 116 can press on the layer of powder to compact the powder.

The printhead 102 can also optionally include a first sensing system 118 and/or a second sensing system 120 to detect properties of the layer before and/or after the powder has been dispensed by the dispensing system 112.

In some implementations, the printhead 102 includes a second dispenser 122 to dispense a second powder 108. The second dispenser 122, if present, can be constructed similarly with a hopper 122a and channel 122b. A second spreader 126 can operate with the second dispenser 122 to spread and compact the second powder 108. A second heater 124 can be located, relative to the forward moving direction of the printhead 102, behind the second dispenser 122.

The first powder particles 106 can have a larger mean diameter than the second powder particles 108, e.g., by a factor of two or more. When the second powder particles 108 are dispensed on a layer of the first powder particles 106, the second powder particles 108 infiltrate the layer of first powder particles 106 to fill voids between the first powder particles 106. The second powder particles 108, being smaller than the first powder particles 106, can achieve a higher resolution, higher pre-sintering density, and/or a higher compaction rate.

Alternatively or in addition, if the apparatus 100 includes two types of powders, the first powder particles 106 can have a different sintering temperature than the second powder particles. For example, the first powder can have a lower sintering temperature than the second powder. In such implementations, the energy source 114 can be used to heat the entire layer of powder to a temperature such that the first particles fuse but the second powder does not fuse.

In implementations when multiple types of powders are used, the first and second dispensers 112, 122 can deliver the first and the second powder particles 106, 108 each into different selected areas, depending on the resolution requirement of the portion of the object to be formed.

Examples of metallic particles include metals, alloys and intermetallic alloys. Examples of materials for the metallic particles include titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

Returning to FIG. 1, the apparatus 100 also includes powder fusing assembly 140 that can translate across the build platform 104. The powder fusing assembly 140 includes at least one energy delivery system 150 that can generate at least one light beam 152 that is directed toward the uppermost layer of powder on the platform 104 and that can be used at least for fusing of the layer of powder on the platform 104. The light beam 152 and/or another light beam can be used for pre-heating and/or heat-treating the layer of powder.

The powder fusing assembly 140 also includes an air knife 200 to generate a flow of gas (shown by arrow 206) across the layer of powder. This flow of gas 206 can help reduce spatter caused by fusing of the powder by the light beam 152.

As noted above, the powder fusing assembly 140 can translate across the build platform 104. For example, the apparatus 100 can include a support, e.g., a linear rail or pair of linear rails 119, along which the powder fusing assembly 140 can be moved by a linear actuator and/or motor. In some implementations, the printhead 102 and the powder fusing assembly 140 are independently movable. In some implementations, the powder fusing assembly 140 can translate along the same direction (e.g., shown by arrow A) as the printhead 102. Alternatively, the powder fusing assembly 140 can translate along a horizontal direction perpendicular to direction travelled by the printhead.

In some implementations, the printhead 102 and powder fusing assembly 140 are supported by and movable on the same support, e.g., the linear rail or pair of linear rails 119. In some implementations, the printhead 102 and the powder fusing assembly 140 are physically connected (see FIG. 2B) in a fixed position relative to each other. In this case, the printhead 102 and powder fusing assembly 140 move together, e.g., by the same actuator or motor.

In some implementations, the printhead 102 and the powder fusing assembly 140 are mechanically coupled to the same vertical actuator such that both are movable up or down together. This permits the dispenser(s) and any beam scanner(s) of the powder fusing assembly to maintain a constant distance from the uppermost layer of powder on a layer-by-layer basis.

Figure 3A:
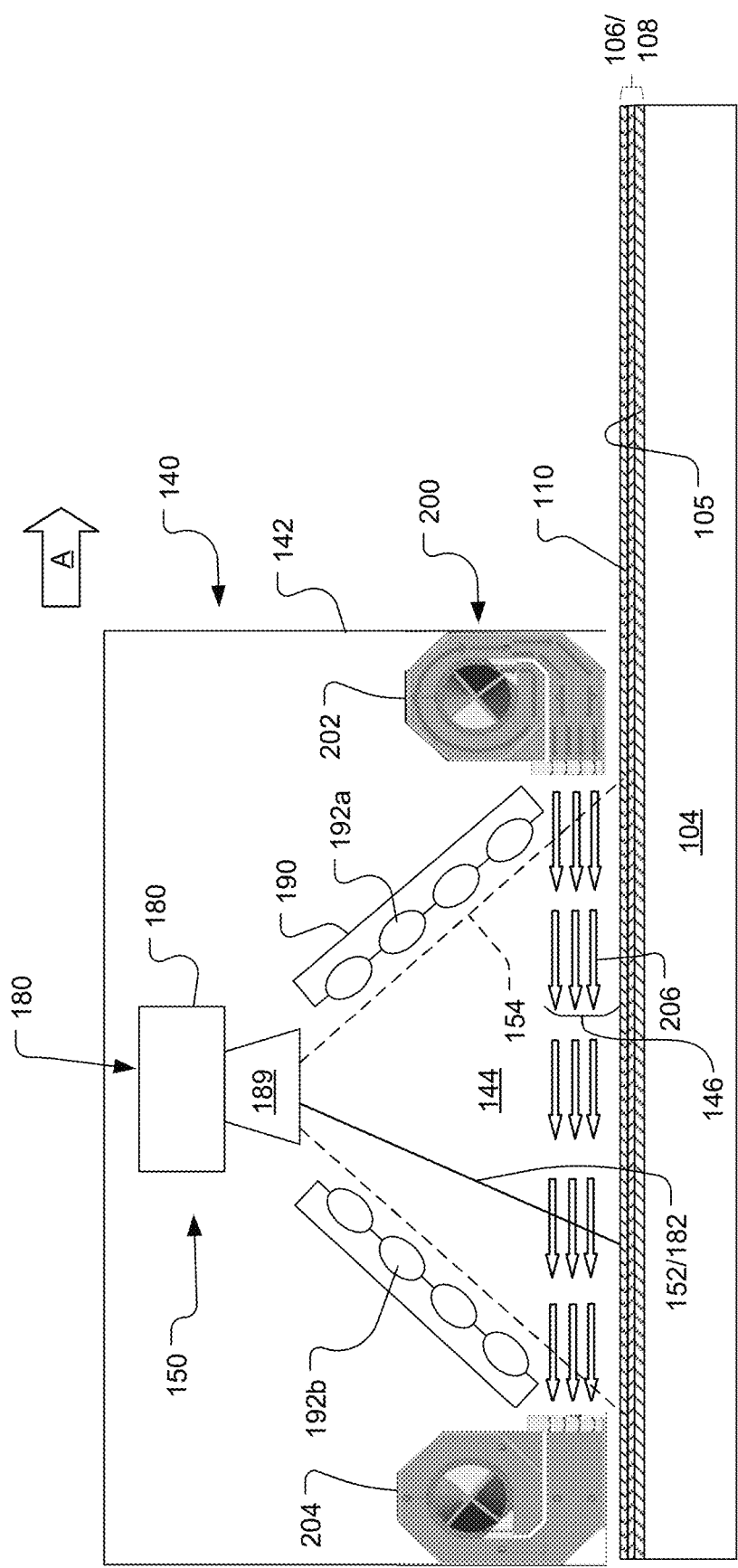
FIG. 3A is a schematic cross-sectional side view of a portion of the additive manufacturing apparatus.

Referring to FIGS. 1 and 3A, the powder fusing assembly 140 can include a frame 142 to which various components, e.g., components of the energy delivery system 150 and the air knife 200, are secured. In some implementations, the printhead 102 is secured to the frame 142. Although FIGS. 1 and 3A illustrate the frame 142 as a closed housing, this is not necessary; the frame could simply be an open framework sitting within the housing 130.

The powder fusing assembly 140 includes an open volume 144 that extends from the surface 105 of the build platform 104 to the optical components of the energy delivery system 150. The open volume 144 at least encompasses a field of view 154 of the energy delivery system 150, i.e., the region through which the light beam(s) 152 can sweep to scan the layer 110 of powder. The air knife 200 is configured to generate the flow of gas 206 across a portion 146 of the open volume 144 that is adjacent the layer 110 on the build platform 104.

The energy delivery system 150 includes at least one light source to generate at least one light beam 152 and at least one reflector assembly to scan the light beam 152 on the layer 110 of powder.

In some implementations, at least one reflector assembly is configured to sweep a light beam along a substantially linear path on the uppermost layer. In particular, each sweep can be a linear path on the layer of powder along a direction B (see FIG. 3B). The direction B can be perpendicular to the direction A of travel powder fusing assembly 140 (e.g., into or out of the page shown in FIGS. 1 and 3A), or parallel to the direction A of travel of the dispenser 102.

In some implementations, at least one reflector assembly is configured to scan a light beam along an arbitrary path in both A and B directions, e.g., unlike the implementation above, the light beam is not constrained to move along a linear path.

Figure 3B:
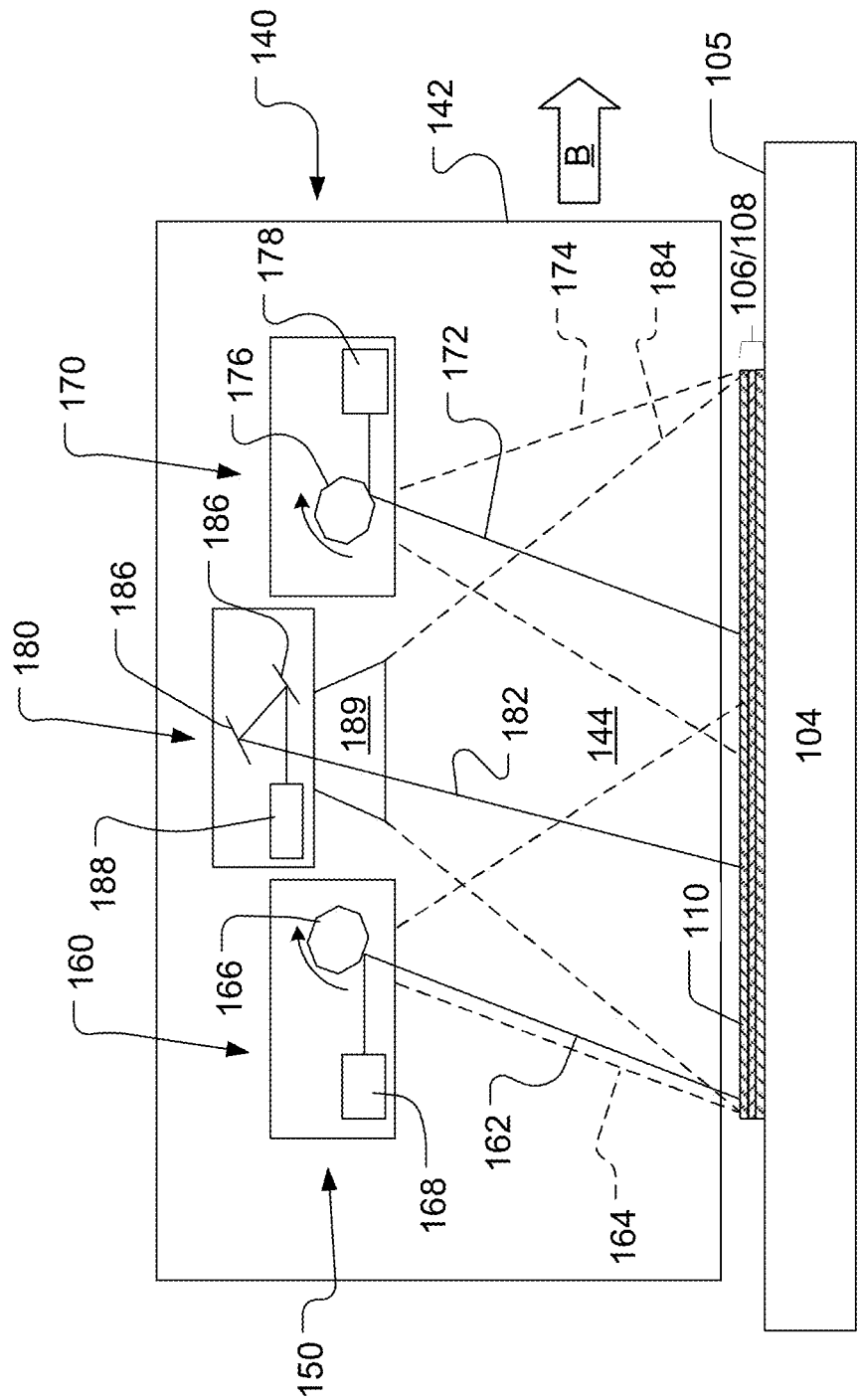
FIG. 3B is a schematic cross-sectional front view of the portion of the additive manufacturing apparatus from FIG. 3A.
Figure 4:
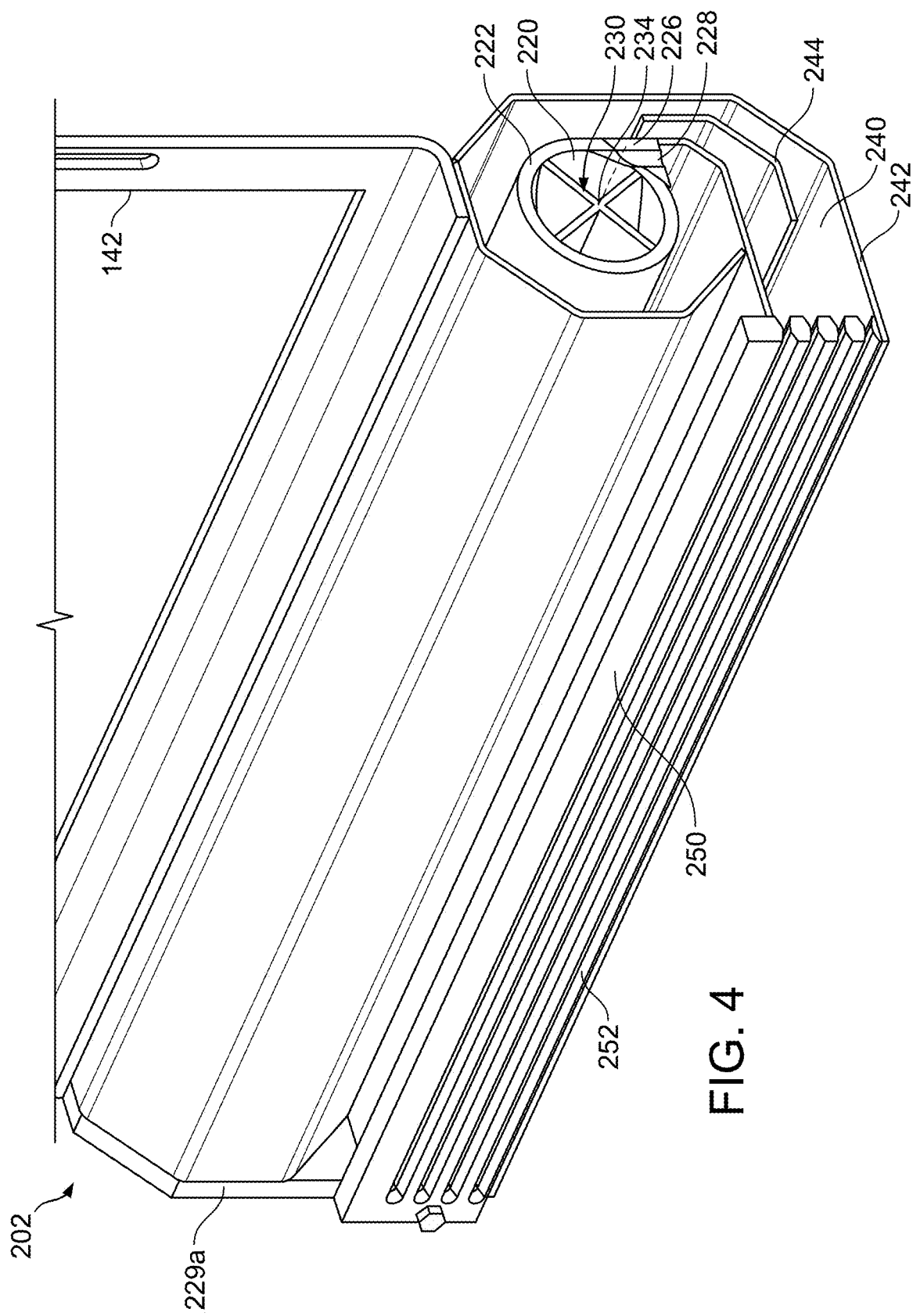
FIG. 4 is a schematic perspective view, partially cross-sectional, of an air knife from the additive manufacturing apparatus.

Referring to FIG. 3B, in some implementations, the energy delivery system 150 includes a first beam scanning system 160, a second beam scanning system 170, and a third beam scanning system 180. The three beam scanning systems 160, 170, 180 generate three light beams 162, 172, 182, respectively, that are scanned on the layer 110 of powder by a first polygonal mirror scanner 166, and a second polygonal mirror scanner 176, and a dual galvo mirror scanner 186, respectively. The light beam 152 can be provided by any of the light beams 162, 172, 182, and the reflector assembly can include any of the first polygonal mirror scanner 166, second polygonal mirror scanner 176, or dual galvo mirror scanner 186, respectively. Each beam scanning system 160, 170, 180 can be secured to and move with the frame 142 of the powder fusing assembly 140.

The first beam scanning system 160 can include a first light source 168, e.g., a laser, to generate a first light beam 162, e.g., a laser beam. The first light source 168 can be a light-emitting diode, e.g., a 400-450 nm blue light emitting diode, a laser, e.g., a 500-540 nm second harmonic laser, or another appropriate light source. The first polygonal beam scanner 166 is positioned in the path of the first light beam 162 to reflect the first light beam 162 toward the platform 104. The first polygonal beam scanner 166 includes a mirror having a plurality of reflective facets, e.g., in the form of a regular polygon. Rotation of the polygon will cause each facet to move so as to cause the first light beam 162 to sweep along the path on the platform 104. The axis of rotation of the polygon can be perpendicular to the direction B of travel of the first light beam along the path.

As the first light beam 162 sweeps along the path, the first light beam 162 can be modulated, e.g., by causing the first light source 168 to turn the first light beam 162 on and off, in order to deliver energy to selected regions of the layer 110 of powder. In conjunction with the relative motion between the powder fusing assembly 140 and the platform 104, a sequence of linear sweeps along the path by the first light beam 162 can create a raster scan of the light beam 162 across the uppermost layer 110.

The second beam scanning system 170 can include a second light source 178, e.g., a laser, to generate a second light beam 172, e.g., a laser beam. The second light source 172 can be a light-emitting diode, e.g., a 400-450 nm blue light emitting diode, a laser, e.g., a 500-540 nm second harmonic laser, or another appropriate light source. The second polygonal beam scanner 176 is positioned in the path of the second light beam 172 to reflect the second light beam 172 toward the platform 104. The second polygonal beam scanner 176 includes a mirror having a plurality of reflective facets, e.g., in the form of a regular polygon. Rotation of the polygon will cause each facet to move so as to cause the second light beam 172 to sweep along the path on the platform 104. The axis of rotation of the polygon can be perpendicular to the direction B of travel of the second light beam along the path.

As the second light beam 172 sweeps along the path, the second light beam 172 can be modulated, e.g., by causing the second light source 178 to turn the second light beam 172 on and off, in order to deliver energy to selected regions of the layer 110 of powder. In conjunction with the relative motion between the powder fusing assembly 140 and the platform 104, a sequence of sweeps along the path by the second light beam 172 can create a raster scan of the second light beam 172 across the uppermost layer 110.

Optionally, the first light beam 162 and/or the second light beam 172 can pass through one or more focusing lenses. A focusing lens can be positioned before and/or after the respective polygonal beam scanner.

In some implementations, the field of view 164 of the first beam scanning system 160 covers at least a half of the width of the build area on the platform 104, and the field of view 174 of the second beam scanning system 170 covers at least the other half of the width of the build area on the platform 104 (the width is along the B direction). In some implementations, the field 164 and the field 174 partially overlap, e.g., by no more than about 25%, e.g., no more than 10%.

In some implementations, the field 164 of the first light beam 162 and the field 174 of the second light beam 172 each cover the entire width of the build area on the platform 104.

Although FIG. 3B illustrates separate and independently controllable light sources 168, 178 for the first light beam 162 and second light beam 172, there could be a common light source that generates a light beam that is split, e.g., with a beam splitter, into the first light beam and second light beam.

Referring to FIGS. 3A and 3B, the third beam scanning system 180 can include a third light source 188, e.g., a laser, to generate the third light beam 182. The third light source can be relatively high power, e.g., 1-10 kW. The third light beam 182 can be scanned across the build area on the platform 104 by a pair of galvo mirror scanners 186 that can provide motion of the third light beam 182 along two perpendicular axes. A scan lens 189 can be used to focus and direct the third light beam 182. Due to the pair of galvo mirror scanners 186, the light beam 182 can traverse the layer of powder in an arbitrary path, e.g., unlike the first energy delivery system 140, the light beam is not constrained to move along a liner path or a raster scan.

Referring to FIGS. 1, 3A and 3B, the scan field 184 of the third beam scanning system 180, e.g., the area addressable by the pair of galvo mirror scanners 186, can span the entire width of the build area on the platform 104. In some implementations, e.g., where the powder fusing assembly 140 is movable, the area addressable by the pair of galvo mirror scanners 186, can span less than the entire length of the build area on the platform 104.

Alternatively, the area addressable by the first, second and/or third beam scanning system 160, 170 and/or 180 can be a portion of the width of the build area, and the powder fusing assembly 140 can be movable so as to shift the scan field 184 across the platform 104 along the width direction (e.g., the B direction in FIG. 3B).

FIG. 3B illustrates the light sources 168, 178, 188 as being supported on and moving with the frame 142 of the powder fusing assembly 140. Alternatively, any or all of the light sources 168, 178, 188 could be stationary, and the light could be delivered to the respective beam scanner 166, 176, 186 by a flexible optical fiber. One end of the flexible optical fiber would be attached to the light source, and the other end of the flexible optical fiber would be movable and secured in a fixed position relative to the beam scanner.

The various beam scanners 160, 170, 180 can each be used for pre-heating of the powder, fusing of the powder, and/or heat treatment of the layer. In the case of pre-heating, a light beam raises the temperature of the powder from an initial temperature to an elevated temperature that is still below the temperature at which the powder melts or fuses. In the case of fusing, a light beam scans the layer of powder and selectively raises the temperature of the powder to a temperature sufficient for the powder to melt or fuse. In the case of heating-treatment, a light beam delivers heat so as to control the rate of cool down of the material.

In some implementations, the first and second beam scanners 160, 170, are used for pre-heating of the powder and/or heat treatment of the layer, whereas the third beam scanner 180 is used to fuse the powder. In some implementation, the first beam scanner 160 is used for pre-heating, and the second beam scanner 170 is used for heat treatment. In some implementation, the first beam scanner 160 and second beam scanner 170 for both pre-heating and heat treatment, but for separate regions of the build area on the platform.

Referring to FIGS. 1 and 3A, the powder fusing assembly 140 can also include a heat source 190. The heat source 190 can be used for pre-heating and/or heat treatment of the layer. The heat source 190 can include at least one array of heat lamps 192, e.g., infra-red lamps. For example, the heat source 190 can include a first array 192*a* of heat lamps positioned to illuminate a region before (relative to the direction of travel A) a linear scan region below the energy delivery system 150 to provide pre-heating of the layer 110, and a second array 192*b* of heat lamps positioned to illuminate a region after (relative to the direction of travel A) the linear scan region below the energy delivery system 150 to provide heat-treatment of the layer 110.

Each array of heat lamps 192 can be arranged along a plane that oblique relative to the top surface 105 of the build platform 104. This permits the heat lamps 192 to sit outside the field of view 154 of the energy delivery system 150.

Referring to FIGS. 1 and 3A, the air knife 200 includes a supply unit 202 and an exhaust unit 204. The supply unit 202 and the exhaust unit 204 are positioned on opposite sides of the powder fusing assembly 140. In particular, the supply unit 202 and the exhaust unit 204 can be positioned on opposite sides of the open volume 144. The supply unit 202 and the exhaust unit 204 can be constructed substantially identically, but as mirror images.

Referring to FIGS. 4-10, each unit, i.e., both the supply unit 202 and the exhaust unit 204, includes a primary plenum 220, a helical gas distributor 230 within the primary plenum 220, and a secondary plenum 240 surrounding the primary plenum 220. Each unit 202, 204 can be secured to the frame 142. Thus, the air knife 200 can move with the energy delivery system 150. Although the supply unit 202 is discussed below, the exhaust unit 204 can have the same parts and configuration as the supply unit, but arranged in a mirror-image configuration across a plane perpendicular to the build surface 105.

Figure 7:
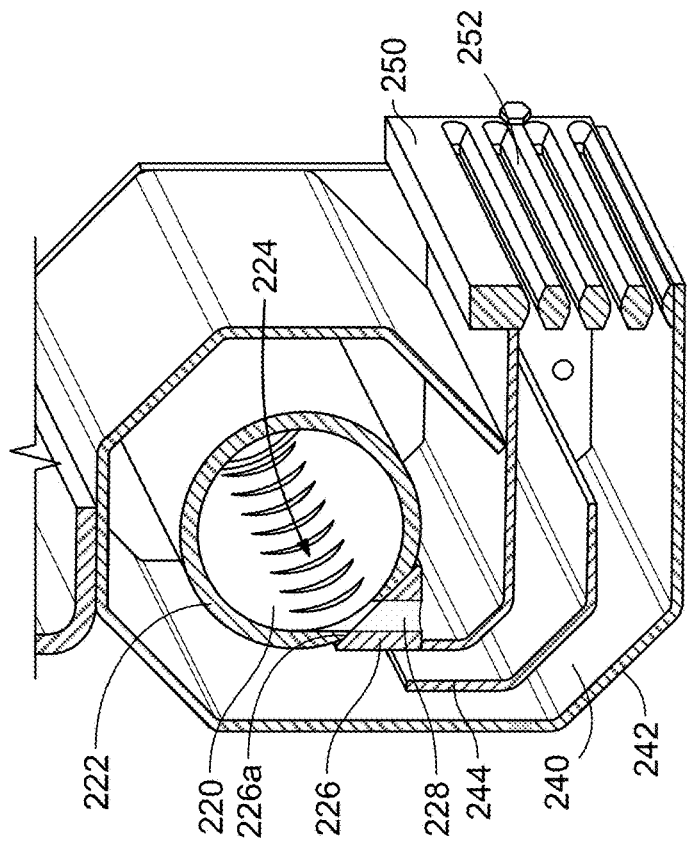
FIG. 7 is a schematic perspective view, partially cross-sectional, of some components of the air knife.

As shown in FIG. 7, the primary plenum 220 includes a circular tube 222; the volume of the plenum 220 defined by the interior of the tube 222. Multiple holes 224 are formed through the body of the tube 222 for the flow of gas. The holes 224 a multi-fluted helical screw. The holes 224 can be arranged in a linear array, and can be equally sized and equally spaced in the linear array. The holes 224 extend tangentially through the body of the circular tube 222. This tangential arrangement can be beneficial for consistent gas flow.

Figure 8:
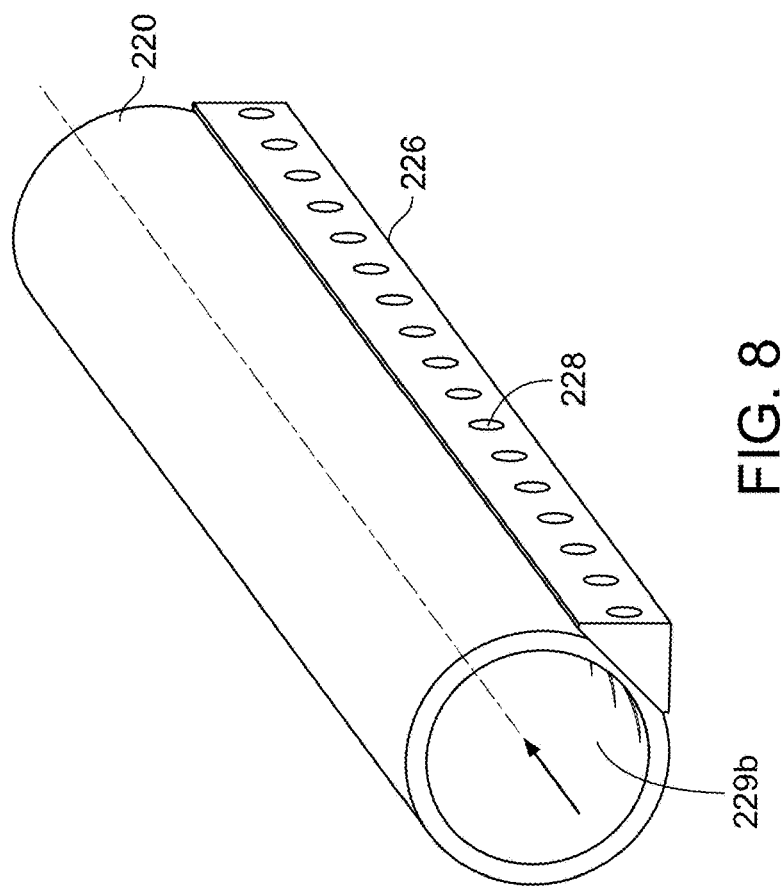
FIG. 8 is a schematic perspective view, partially cross-sectional, of some components of the air knife.

As shown in FIGS. 5, 7 and 8, a part 226 with a triangular cross-section, e.g., a right triangular cross section, can extend along the length of the tube 222. The holes 224 in the circular tube 222 extend to corresponding holes 228 through the triangular part 226. The part 226 can abut the tube 222, e.g., the surface 226a that provides the hypotenuse in the triangular cross-section can contact the tube 222. In addition, a portion of the outer surface of the tube 222 can be flattened so that the part 226 and the tube 222 are in planar contact.

Figure 9:
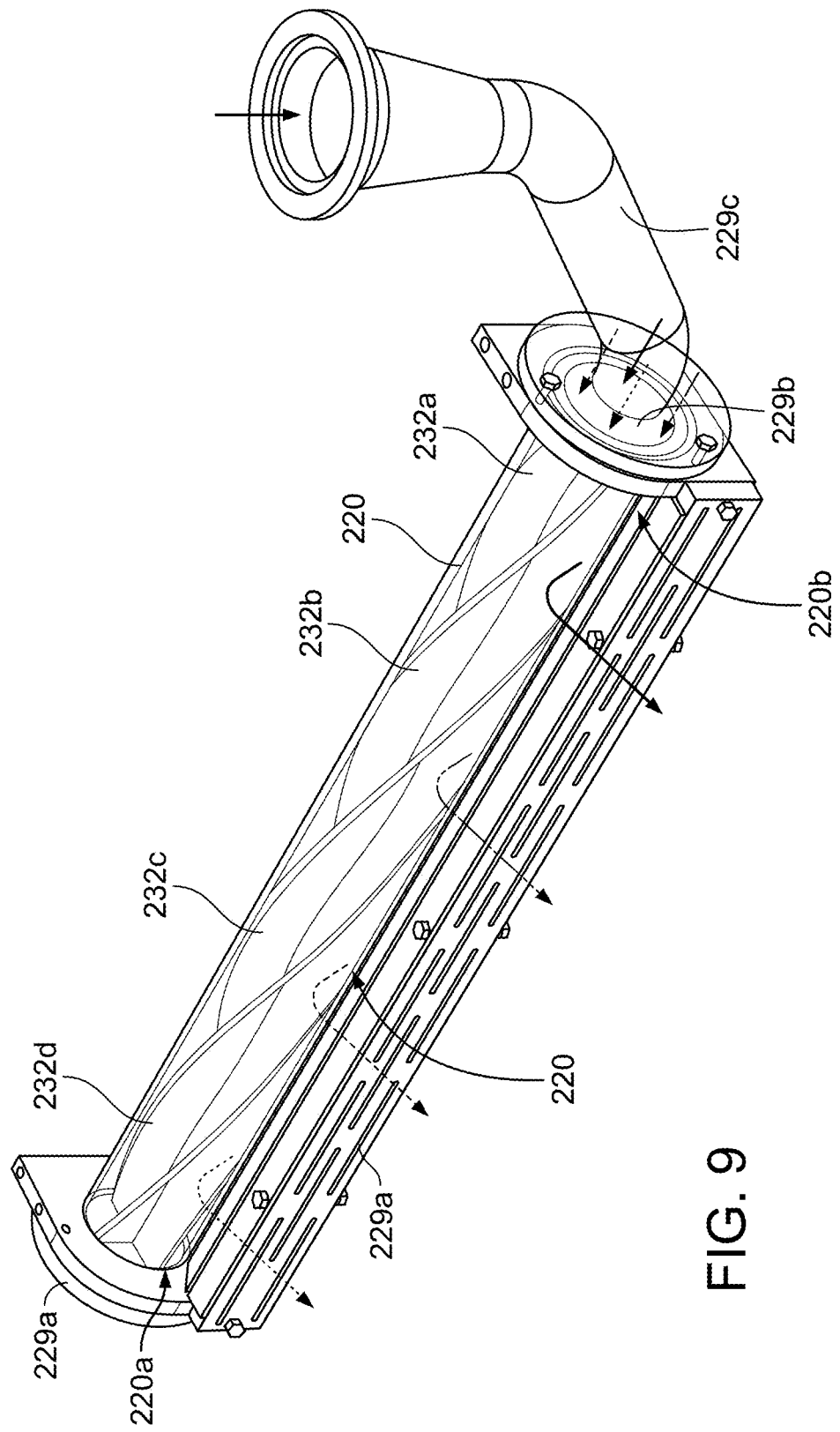
FIG. 9 is a schematic perspective view of some components of the air knife.

As shown in FIG. 9, the primary plenum 220 is capped at one end 220a, e.g., by a cap 229a. The other end provides a gas input end 220b that has a gas inlet 229b, e.g., an axial gas inlet. The gas inlet 229b can include a tube 229c, e.g., a foreline, that is connected to a gas supply, e.g., a pump or facilities gas supply line.

As shown in FIG. 5, within the primary plenum 220 is the helical gas distributor 230. The helical gas distributor 230 can be a multi-fluted helical screw positioned in the tube 222. That is gas distributor includes a plurality of flutes 232. The flutes 232 spiral around the longitudinal axis 234 of the screw. For example, the helical gas distributor can be a 4-fluted helix with flutes 232a-232d. The flutes 232 can be equally spaced around the longitudinal axis 234.

The gas flowing into the input end 220b of the primary plenum 220 is split evenly between the spaces between the flutes 232 of the helical gas distributor 230. The flutes 232 then evenly distribute the gas to the holes 224 along the length of the tube 222. The helical gas distributor 230 can distribute the gas uniformly through the holes 224 covered by respective flutes 232 with a low pressure drop, e.g., less than 2 psi. The helical gas distributor 230 can be stationary relative to the tube 222.

The helix of the helical gas distributor 230 can either be a left hand or a right hand helix, depending on the positioning of the inlet tube 229c, to help turn the gas either clockwise or counterclockwise through the holes 224 from primary plenum 220.

Returning to FIGS. 5-6, the secondary plenum 240 is a spiral cross sectioned cavity into which the gas enters through the array of holes 224/228 from the primary plenum 220. The plenum 240 can be provided by the interior of a housing 242. The housing 242 can have flat side panels as shown in FIGS. 5-7, or be a continuous curved part. The spiral of the secondary plenum 240 can complete at least one full revolution around the primary plenum 220. As the gas spirals through the secondary plenum 240 towards the exit, non-uniformity across the width of the secondary plenum 240 tends to average out along the travel length through the spiral cavity. The gas flow can also be divided by one or more vanes 244 within the secondary plenum 240.

In the supply unit, a nozzle plate 250 is secured at the exit face of the secondary plenum 240. The nozzle plate 250 can receive an even supply of the gas. This gas passes through slots or holes 252 in the nozzle plate to create a uniform laminar flow across the build plate. The slots 252 can extend parallel to the longitudinal axis of the gas supply unit 202, e.g., horizontally. The slots 252 can be evenly spaced vertically on the nozzle plate.

Figure 10:
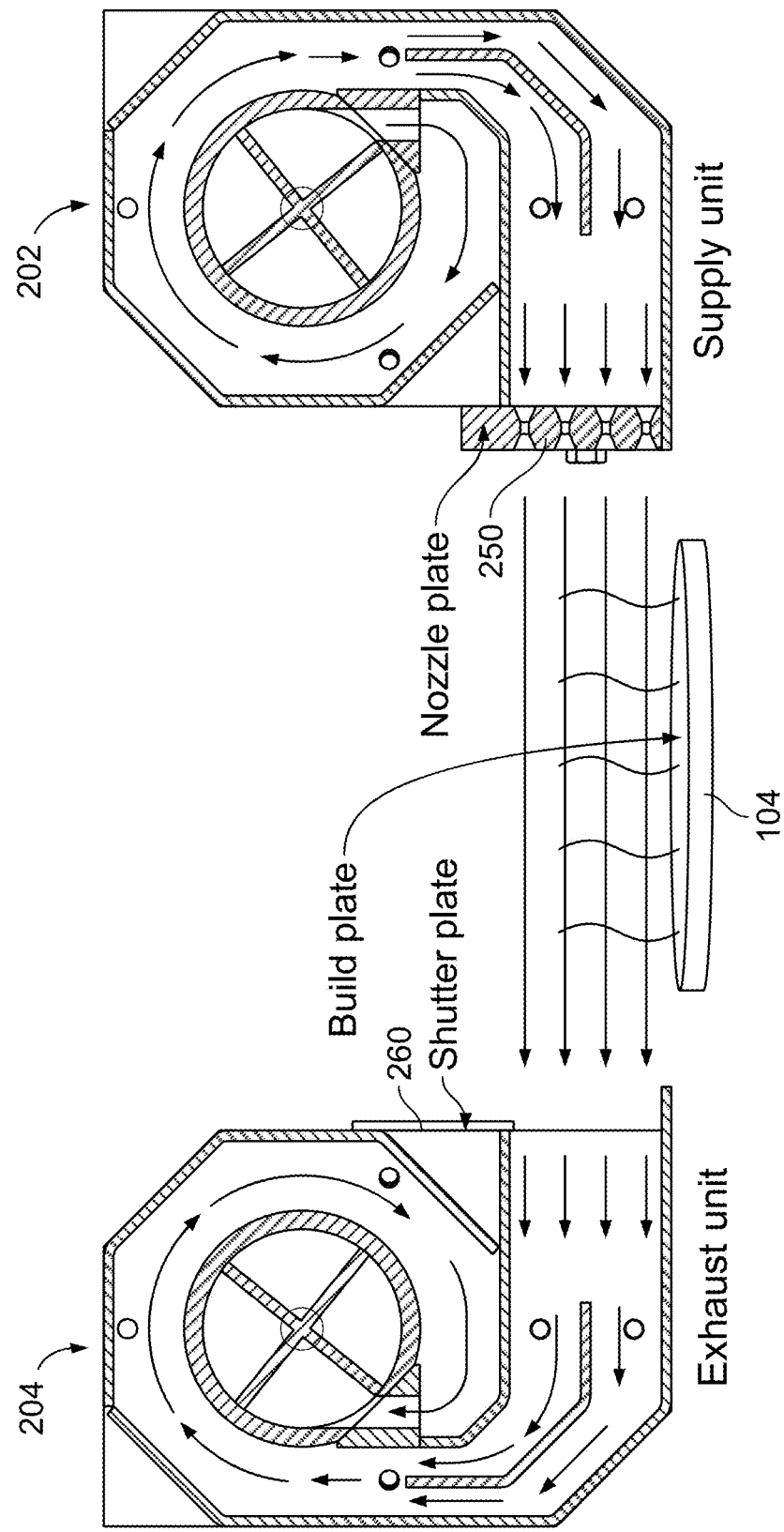
FIG. 10 is a schematic cross-sectional view of the gas supply unit and exhaust unit of the powder fusing assembly.

In FIG. 10, the exhaust unit 204 does not include the nozzle plate, but can instead include a shutter 260 to balance the exhaust with the supply to achieve a uniform laminar flow.

The spiral body architecture coupled with the helical gas distributor can deliver flow velocities of 2-3 m/s.

The gas can be an inert gas, e.g., Argon.

The apparatus 100 includes a controller 195 coupled to the various components of the apparatus, e.g., power sources for the light sources and heaters, actuators and/or motors to move the printhead 102 and powder fusing assembly 140, actuators and/or motors for the components, e.g., dispensers and beam scanners, within the printhead 102 and powder fusing assembly 140, etc., to cause the apparatus to perform the necessary operations to fabricate an object.

The controller 195 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 195 can generate instructions usable by each of the systems operable with the controller 195, for example, to dispense the powder 106, to fuse the powder 106, to move various systems of the apparatus 100, and to sense properties of the systems, powder, and/or the object 10. In some implementations, the controller 195 can control the first and second dispensing systems 112, 122 to selectively deliver the first and the second powder particles 106, 108 to different regions.

The controller 195, for example, can transmit control signals to drive mechanisms that move various components of the apparatus. In some implementations, the drive mechanisms can cause translation and/or rotation of these different systems, including. Each of the drive mechanisms can include one or more actuators, linkages, and other mechanical or electromechanical parts to enable movement of the components of the apparatus.

Conclusion

The controller and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made. For example:

Other techniques can be used for dispensing the powder. For example, powder could be dispensed in a carrier fluid, e.g., a quickly evaporating liquid such as Isopropyl Alcohol (IPA), ethanol, or N-Methyl-2-pyrrolidone (NMP), and/or ejected from a piezoelectric printhead. Alternatively, the powder could be pushed by a blade from a powder reservoir adjacent the build platform.

Although FIG. 3B illustrates two polygon scanners and galvo scanner, the system could a larger or smaller number of each kind of scanner. For example, the system could include just a single polygon scanner, just a single galvo scanner, just two polygon scanners, just two galvo scanners, or a single polygon scanner and a single galvo scanner, two each of galvo and polygon scanners, etc. Any given scanner could be used for pre-heating and/or heat treatment and/or fusing of the powder.

For some powders, an electron beam could be used instead of a laser beam to fuse the powder. So the second energy delivery system could include an electron beam source and electron beam scanner rather than a light source and pair of galvo mirror scanners.

The various supports for the components can be implemented as a gantry supported on opposite ends (e.g., on both sides of the platform 104 as shown in FIG. 2B) or a cantilever assembly (e.g., supported on just one side of the platform 104).

Accordingly, other implementations are within the scope of the claims.

What is claimed is:

1. An additive manufacturing apparatus comprising:
a platform;
a dispenser configured to deliver a plurality of successive layers of a feed material onto the platform;
at least one energy source to selectively fuse feed material in a layer on the platform; and
an air knife supply unit including
a tube having a plurality of holes spaced along a length of the tube,
a multi-fluted helical screw positioned in the tube with flutes of the screw that spiral around a longitudinal axis of the screw,
a gas inlet configured to supply a gas into an end of the tube, and wherein the multi-fluted helical screw is shaped for the flutes to guide the gas from the gas inlet through the tube and out through the holes, and
a spiral plenum surrounding the tube, the spiral plenum including an inner end to receive gas from the holes, and an outer end to deliver the gas over the platform.

2. The apparatus of claim 1, comprising a nozzle plate at the outer end of the spiral plenum.

3. The apparatus of claim 2, wherein the nozzle plate comprises a plurality of horizontally extending slots.

4. The apparatus of claim 1, wherein the outer end of the spiral plenum is configured to discharge the gas in a laminar flow parallel to a top surface of the platform.

5. An additive manufacture apparatus comprising:
a platform;
a dispenser configured to deliver a plurality of successive layers of a feed material onto the platform;
at least one energy source to selectively fuse feed material in a layer on the platform;
an air knife supply unit including
a tube having a plurality of holes spaced along a length of the tube,
a multi-fluted helical screw positioned in the tube,
a gas inlet configured to supply a gas into an end of the tube, and wherein the multi-fluted helical screw is shaped for the flutes to guide the gas from the gas inlet through the tube and out through the holes, and
a spiral plenum surrounding the tube, the spiral plenum including an inner end to receive gas from the holes, and an outer end to deliver the gas over the platform; and
an air knife exhaust unit including
a second tube having a second plurality of holes spaced along a length of the second tube,
a second multi-fluted helical screw positioned in the second tube,
a gas outlet configured to receive gas at an end of the second tube, and wherein the second multi-fluted helical screw is configured such that the flutes guide the gas from the holes to the gas outlet at the end of the second tube, and
a second spiral plenum surrounding the second tube, the second spiral plenum including an outer end to receive gas from over the platform, and an inner end to deliver the gas to the holes.

6. An additive manufacturing apparatus comprising:
a platform;
a dispenser configured to deliver a plurality of successive layers of a feed material onto the platform;
at least one energy source to selectively fuse feed material in a layer on the platform; and
an air knife exhaust unit including
a tube having a plurality of holes spaced along a length of the tube,
a multi-fluted helical screw positioned in the tube,
a gas outlet configured to receive a gas from an end of the tube, and wherein the multi-fluted helical screw is shaped for the flutes to guide the gas from the holes through the tube and out through the outlet, and
a spiral plenum surrounding the tube, the spiral plenum including an inner end to deliver gas to the holes, and an outer end to receive gas from the platform.

7. The apparatus of claim 6, comprising a shutter at the outer end of the spiral plenum.

8. An additive manufacturing apparatus comprising:
a platform;
a dispenser configured to deliver a plurality of successive layers of a feed material onto the platform;
at least one energy source to selectively fuse feed material in an uppermost layer on the platform;
a housing positioned to be above the uppermost layer on the platform and horizontally movable over the platform and defining an open chamber that is open at the bottom over the platform and has canted sidewalls; and an air knife including a gas supply unit, a gas exhaust unit, the gas supply unit and gas exhaust unit secured to the housing to move with the housing, the gas supply unit and gas exhaust unit positioned on opposite sides of the chamber to cause gas flow through the chamber over the uppermost layer on the platform.

9. The apparatus of claim 8, wherein the gas supply unit and gas exhaust unit are positioned at a bottom edge of the housing.

10. The apparatus of claim 8, wherein the at least one energy source is secured to and moves with the housing.

11. The apparatus of claim 10, wherein the at least one energy source comprises a galvo mirror scanner to scan a first light beam from the at least one energy source.

12. The apparatus of claim 10, wherein the at least one energy source comprises a galvo mirror scanner to scan a second light beam from the at least one energy source.

13. The apparatus of claim 8, further comprising an array of heat lamps positioned on the canted sidewalls of the chamber.

14. The apparatus of claim 8, wherein the housing is movable over the platform in along a first axis, and the gas supply unit and gas exhaust unit are positioned on opposite sides of the chamber with respect to the first axis.

* * * * *